US012686766B2

(12) United States Patent
Tong et al.

(10) Patent No.: US 12,686,766 B2
(45) Date of Patent: Jul. 21, 2026

(54) CURABLE COMPOSITIONS, ARTICLES THEREFROM, AND METHODS OF MAKING AND USING SAME

(71) Applicant: 3M INNOVATIVE PROPERTIES COMPANY, St. Paul, MN (US)

(72) Inventors: Lingjie Tong, Shanghai (CN); Yuan Zhao, Shanghai (CN); Li Yao, Woodbury, MN (US); Shuang Wu, Shanghai (CN); Xiaohai Sheng, Shanghai (CN); Xinxin Sun, Shanghai (CN); Ahmad Shaaban, Cologne (DE); Menghuang Feng, Tianjin (CN)

(73) Assignee: 3M Innovative Properties Company, St. Paul, MN (US)

( * ) Notice: Subject to any disclaimer, the term of this patent is extended or adjusted under 35 U.S.C. 154(b) by 1088 days.

(21) Appl. No.: 17/593,250

(22) PCT Filed: Dec. 13, 2019

(86) PCT No.: PCT/CN2019/125303
§ 371 (c)(1),
(2) Date: Sep. 14, 2021

(87) PCT Pub. No.: WO2020/192185
PCT Pub. Date: Oct. 1, 2020

(65) Prior Publication Data

US 2022/0153987 A1 May 19, 2022

(30) Foreign Application Priority Data

Mar. 25, 2019 (WO) ................ PCT/CN2019/079523

(51) Int. Cl.

| | |
|---|---|
| ***C08L 63/00*** | (2006.01) |
| ***C08G 59/24*** | (2006.01) |
| ***C08G 59/66*** | (2006.01) |
| ***C08G 59/68*** | (2006.01) |
| ***C08K 3/013*** | (2018.01) |
| ***C08K 3/22*** | (2006.01) |
| ***C08K 5/37*** | (2006.01) |
| ***C08K 7/18*** | (2006.01) |
| ***C08K 9/06*** | (2006.01) |
| ***C09J 163/00*** | (2006.01) |
| ***H01M 10/653*** | (2014.01) |
| ***H01M 50/209*** | (2021.01) |
| ***H01M 50/233*** | (2021.01) |
| ***H01M 50/264*** | (2021.01) |

(52) U.S. Cl.
CPC ............ *C08L 63/00* (2013.01); *C08G 59/245* (2013.01); *C08G 59/66* (2013.01); *C08G 59/686* (2013.01); *C08K 3/013* (2018.01); *C08K 3/22* (2013.01); *C08K 5/37* (2013.01); *C08K 7/18* (2013.01); *C08K 9/06* (2013.01); *C09J 163/00* (2013.01); *H01M 10/653* (2015.04); *H01M 50/209* (2021.01); *H01M 50/233* (2021.01); *C08K 2003/2227* (2013.01); *H01M 50/264* (2021.01); *H01M 2220/20* (2013.01)

(58) Field of Classification Search
CPC ....... C08L 63/00; C08G 59/245; C08G 59/66; C08G 59/686; C08K 3/22; C08K 5/37; C08K 7/18; C08K 9/06; C08K 2003/2227; C08K 3/013; C09J 163/00; H01M 2220/20; H01M 10/653; H01M 50/264; H01M 50/209; H01M 50/233
USPC ........................................................... 524/714
See application file for complete search history.

(56) References Cited

U.S. PATENT DOCUMENTS

| | | | | |
|---|---|---|---|---|
| 3,732,309 | A | 5/1973 | Garnish | |
| 4,260,720 | A | 4/1981 | Bosso | |
| 6,153,719 | A | 11/2000 | Abbey | |
| 7,888,411 | B2 | 2/2011 | Wrosch | |
| 8,795,837 | B2 | 8/2014 | Hartman | |
| 9,926,405 | B2 | 3/2018 | Iwaya | |
| 2009/0062441 | A1 | 3/2009 | Wei | |
| 2011/0178232 | A1 | 7/2011 | Yoshino | |
| 2013/0165600 | A1 | 6/2013 | Chen | |
| 2013/0255879 | A1* | 10/2013 | Bieber ................ | C08G 59/186 523/400 |
| 2018/0118903 | A1 | 5/2018 | Zaffaroni et al. | |
| 2020/0165490 | A1* | 5/2020 | Kryger ................ | C08G 59/245 |

FOREIGN PATENT DOCUMENTS

| | | | |
|---|---|---|---|
| CN | 1289348 | | 3/2001 |
| CN | 103270073 | | 8/2013 |
| CN | 101864269 | | 5/2014 |
| CN | 103923320 | | 5/2016 |
| CN | 105273361 | | 10/2017 |
| CN | 108102556 | | 6/2018 |
| CN | 107141446 | | 8/2019 |
| CN | 107189348 | | 1/2020 |
| EP | 1291390 | | 3/2003 |
| GB | 1563774 | A | 4/1980 |

(Continued)

OTHER PUBLICATIONS

Plueddemann, Silane Coupling Agents—2nd Edition, (1991), 3 Pages.

(Continued)

*Primary Examiner* — Kelechi C Egwim

(74) *Attorney, Agent, or Firm* — Jean A. Lown; Adrian L. Pishko

(57) ABSTRACT

A curable composition includes a first part comprising an epoxy resin; and a second part comprising a multifunctional, functional thiol containing compound. The curable composition further includes an inorganic filler present in an amount of at least 40 weight %, based on the total weight of the curable composition. The multifunctional, functional thiol containing compound comprises ether in the backbone thereof.

16 Claims, 2 Drawing Sheets

(56) References Cited

FOREIGN PATENT DOCUMENTS

| | | | |
|---|---|---|---|
| JP | 2018-525465 | A | 9/2018 |
| WO | 2012087546 | A1 | 6/2012 |
| WO | 2013070415 | A1 | 5/2013 |
| WO | 2013158517 | A1 | 10/2013 |
| WO | WO 2015-002301 | | 1/2015 |
| WO | WO 2015-094896 | | 6/2015 |
| WO | WO 2020-191579 | | 10/2020 |

OTHER PUBLICATIONS

International Search Report for PCT International Application No. PCT/CN2019/125303, mailed on Mar. 13, 2020, 4 pages.

* cited by examiner

CURABLE COMPOSITIONS, ARTICLES THEREFROM, AND METHODS OF MAKING AND USING SAME

PRIORITY CLAIM

This application claims priority to PCT application No. PCT/CN2019/079523 filed on Mar. 25, 2019.

FIELD

The present disclosure generally relates to curable compositions that include an epoxy composition and a thiol composition. The curable compositions may be used, for example, as thermally conductive gap fillers, which may be suitable for use in electronic applications such as battery assemblies.

BACKGROUND

Curable compositions based on epoxy or polyamide resins have been disclosed in the art. Such curable compositions are described in, for example, U.S. Pat. No. 9,926,405, U.S. Pat. App. Pub. 2013/0165600, and EP Patent 1291390.

SUMMARY

In some embodiments, a curable composition is provided. The composition includes a first part comprising an epoxy resin; and a second part comprising a multifunctional, functional thiol containing compound. The curable composition further includes an inorganic filler present in an amount of at least 40 weight %, based on the total weight of the curable composition. The multifunctional, functional thiol containing compound comprises an ether in the backbone thereof.

DETAILED DESCRIPTION

Figure 1:
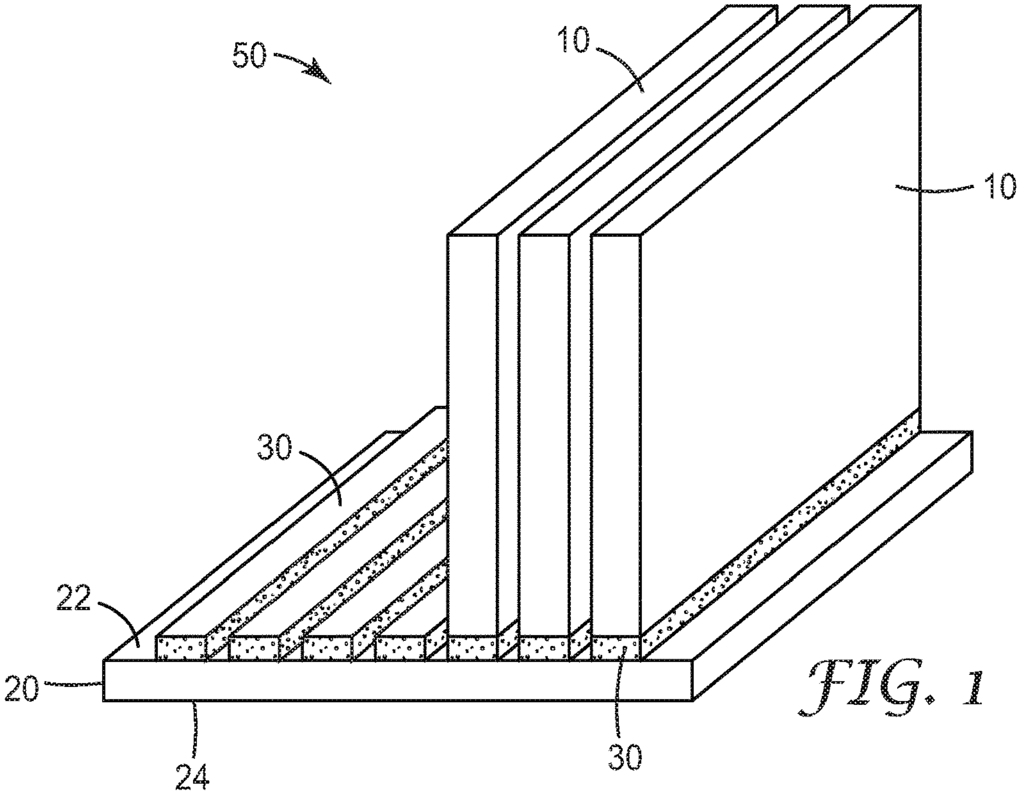
FIG. 1 illustrates the assembly of an exemplary battery module according to some embodiments of the present disclosure.

Thermal management plays an important role in many electronics applications such as, for example, electric vehicle (EV) battery assembly, power electronics, electronic packaging, LED, solar cells, electric grid, and the like. Certain thermally conductive materials (e.g., adhesives) may be an attractive option for these applications due to good electrical insulative properties, feasibility in processing for integrated parts or complex geometries, and good conformability/wettability to different surfaces, especially the ability to efficiently dissipate the heat away while having good adhesion to different substrates for assembly.

Regarding applications in EV battery assemblies, currently, one such application that utilizes a thermally conductive material is the gap filler application. Generally, requirements for the gap filler application include high thermally conductivity, good overlap shear adhesion strength, good tensile strength, good elongation at break for toughness, and damping performance, and good hydrolytic stability, in addition to having low viscosity before curing. However, to achieve high thermal conductivity, typically, a large amount of inorganic thermally conductive filler is added to the composition. The high loading of thermally conductive fillers, however, has a deleterious impact on adhesion performance, toughness, damping performance, elongation at break and viscosity.

Furthermore, compositions useful for the gap filler application should have relatively fast curing profiles to accommodate the automated processing requirements of the industry.

A filled curable composition that includes an epoxy resin, a polyamide composition, an amino functional compound, and a multi-functional (meth)acrylate provides many of the above discussed attributes but does not provide, in some applications, sufficient hydrolytic stability. Another filled curable composition that includes an epoxy composition and a polyamide composition, the polyamide composition including a polyamide having one or more tertiary amides in the backbone thereof, also provides many of the above discussed attributes but does not provide, in some applications, sufficient elongation at break.

In order to solve the above-discussed problems associated with high loadings of inorganic thermally conductive filler, a curable composition providing a good balance of the above discussed desired properties has been discovered that includes an epoxy composition and a thiol composition. Specifically, in addition to exhibiting all of the desired attributes discussed above, the curable compositions of the present disclosure can achieve high thermally conductive, high bonding strength while at the same time high elongation at break.

As Used Herein:

The term “room temperature” refers to a temperature of 22° C. to 25° C.

The terms “cure” and “curable” refer to joining polymer chains together by covalent chemical bonds, usually via crosslinking molecules or groups, to form a network polymer. Therefore, in this disclosure the terms “cured” and “crosslinked” may be used interchangeably. A cured or crosslinked polymer is generally characterized by insolubility, but it may be swellable in the presence of an appropriate solvent.

The term “unfilled” when used in connection with a component or a composition refers to all the materials that make up that component or composition except for inorganic fillers (e.g., thermally conductive fillers).

The term “backbone” refers to the main continuous chain of a polymer.

The term “aliphatic” refers to C1-C40, suitably C1-C30, straight or branched chain alkenyl, alkyl, or alkynyl which may or may not be interrupted or substituted by one or more heteroatoms such as O, N, or S.

The term “cycloaliphatic” refers to cyclized aliphatic C3-C30, suitably C3-C20, groups and includes those interrupted by one or more heteroatoms such as O, N, or S.

The term “alkyl” refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of “alkyl” groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "aromatic" refers to C3-C40, suitably C3-C30, aromatic groups including both carbocyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

Repeated use of reference characters in the specification is intended to represent the same or analogous features or elements of the disclosure. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range.

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

In some embodiments, the present disclosure provides a highly filler loaded thermally conductive curable composition formulated by blending an epoxy composition and a thiol composition.

In some embodiments, the epoxy compositions may include one or more epoxy resins. Suitable epoxy resins may include aromatic polyepoxide resins (e.g., a chain-extended diepoxide or novolac epoxy resin having at least two epoxide groups), aromatic monomeric diepoxides, aliphatic polyepoxide, ormonomeric diepoxides. A cross-linkable epoxy resin typically will have at least two epoxy end groups. The aromatic polyepoxide or aromatic monomeric diepoxide typically contains at least one (in some embodiments, at least 2, in some embodiments, in a range from 1 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

In some embodiments, examples of aromatic epoxy resins useful in the epoxy compositions disclosed herein may include novolac epoxy resins (e.g., phenol novolacs, ortho-, meta-, or para-cresol novolacs or combinations thereof), bisphenol epoxy resins (e.g., bisphenol A, bisphenol F, halogenated bisphenol epoxies, and combinations thereof), resorcinol epoxy resins, tetrakis phenylolethane epoxy resins and combinations of any of these.

In some embodiments, useful epoxy compounds include diglycidyl ethers of difunctional phenolic compounds (e.g., p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.) In some embodiments, the adhesive includes a bisphenol diglycidyl ether, wherein the bisphenol (i.e., $-O-C_6H_5-CH_2-C_6H_5-O-$) may be unsubstituted (e.g., bisphenol F), or either of the phenyl rings or the methylene group may be substituted by one or more halogens (e.g., fluoro, chloro, bromo, iodo), methyl groups, trifluoromethyl groups, or hydroxymethyl groups.

In some embodiments, examples of aromatic monomeric diepoxides useful in the epoxy compositions according to the present disclosure include the diglycidyl ethers of bisphenol A and bisphenol F and mixtures thereof. Bisphenol epoxy resins, for example, may be chain extended to have any desirable epoxy equivalent weight. Chain extending epoxy resins can be carried out by reacting a monomeric diepoxide, for example, with a bisphenol in the presence of a catalyst to make a linear polymer. Other aromatic epoxy resins may include difunctional epoxy resins that have a polysulfide polymer backbone such as block copolymer of Thiokol LP and bisphenol F epoxy resin (e.g. FLEP-60 available from Toray Fine Chemicals Co., Ltd., Tokyo, Japan.

In some embodiments, the aromatic epoxy resin (e.g., either a bisphenol epoxy resin or a novolac epoxy resin) may have an epoxy equivalent weight of at least 150, 170, 200, or 225 grams per equivalent. In some embodiments, the aromatic epoxy resin may have an epoxy equivalent weight of up to 2000, 1500, or 1000 grams per equivalent. In some embodiments, the aromatic epoxy resin may have an epoxy equivalent weight in a range from 150 to 2000, 150 to 1000, or 170 to 900 grams per equivalent. In some embodiments, the first epoxy resin has an epoxy equivalent weight in a range from 150 to 450, 150 to 350, or 150 to 300 grams per equivalent. Epoxy equivalent weights may be selected, for example, so that the epoxy resin may be used as a liquid or solid, as desired.

In some embodiments, in addition or as an alternative to aromatic epoxy resins, the epoxy resins of the present disclosure may include one or more non-aromatic epoxy resins. In some cases, non-aromatic epoxy resins can be useful as reactive diluents that may help control the flow characteristics of the compositions. Non-aromatic epoxy resins useful in the curable compositions according to the present disclosure can include a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (x) of oxyalkylene groups, $OR^1$, wherein each IV is independently $C_2$ to $C_5$ alkylene, in some embodiments, $C_2$ to $C_3$ alkylene, x is 2 to about 6, 2 to 5, 2 to 4, or 2 to 3. To become crosslinked into a network, useful non-aromatic epoxy resins will typically have at least two epoxy end groups. Examples of useful non-aromatic epoxy resins include glycidyl epoxy resins such as those based on diglycidyl ether compounds comprising one or more oxyalkylene units. Examples of these include resins made from ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, glycerol triglycidyl ether, propanediol diglycidyl ether, butanediol diglycidyl ether, and hexanediol diglycidyl ether. Other useful non-aromatic epoxy resins include a diglycidyl ether of cyclohexane dimethanol, a diglycidyl ether of neopentyl glycol, a triglycidyl ether of trimethylolpropane, and a diglycidyl ether of 1,4-butanediol. Crosslinked aromatic epoxies (that is, epoxy polymers) as described herein can be understood to be preparable by crosslinking aromatic epoxy resins. The crosslinked aromatic epoxy typically contains a repeating unit with at least one (in some embodiments, at least 2, in some embodiments, in a range from 1 to 4) aromatic ring (e.g., phenyl group) that is optionally substituted by one or more halogens (e.g., fluoro, chloro, bromo, iodo), alkyl groups having 1 to 4 carbon atoms (e.g., methyl or ethyl), or hydroxyalkyl groups having 1 to 4 carbon atoms (e.g., hydroxymethyl). For repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo).

In some embodiments, the epoxy resins of the present disclosure may be liquid at room temperature. Several curable epoxy resins useful in the epoxy compositions according to the present disclosure may be commercially available. For example, several epoxy resins of various classes and epoxy equivalent weights are available from Olin Corporation, Clayton MO; Hexion Inc., Columbus, Ohio; Huntsman Advanced Materials, The Woodlands, Tex.; CVC Specialty Chemicals Inc. Akron, Ohio (acquired by Emerald Performance Materials); and Nan Ya Plastics Corporation, Taipei City, Taiwan. Examples of commercially available glycidyl ethers include diglycidylethers of bisphenol A (e.g. those available under the trade designations "EPON 828", "EPON 1001", "EPON 1310" and "EPON 1510" from Hexion Inc. Columbus Ohio, those available under the trade designation "D.E.R." from Olin Corporation (e.g., D.E.R. 331, 332, and 334), those available under the trade designation "EPICLON" from Dainippon Ink and Chemicals, Inc. (e.g., EPICLON 840 and 850) and those available under the trade designation "YL-980" from Japan Epoxy Resins Co., Ltd.); diglycidyl ethers of bisphenol F (e.g. those available under the trade designation "EPICLON" from Dainippon Ink and Chemicals, Inc. (e.g., "EPICLON 830")); polyglycidyl ethers of novolac resins (e.g., novolac epoxy resins, such as those available under the trade designation "D.E.N." from Olin Corporation. (e.g., D.E.N. 425, 431, and 438)); and flame retardant epoxy resins (e.g., "D.E.R. 560", a brominated bisphenol type epoxy resin available from Olin Corporation). Examples of commercially available non-aromatic epoxy resins include the glycidyl ether of cyclohexane dimethanol, available from Hexion Inc., under the trade designation "HELOXY MODIFIER 107".

In some embodiments, aromatic epoxy resins useful in the epoxy compositions disclosed herein may include a flexible bisphenol A, bisphenol F, or bisphenol Z epoxy resin represented by the following structural formula:

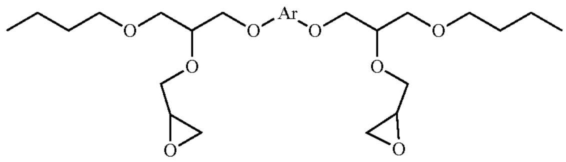

where Ar is an aromatic group (which can include bisphenol A, bisphenol F, or bisphenol Z) having from 10 to 20 carbon atoms and from 0 to 5 substituents selected from aliphatic hydrocarbon groups, ether groups, or combinations thereof.

Examples of suitable aromatic epoxy resins include those available under the trade designation ARALDITE PY-4122 available from Huntsman (Woodlands, TX), SE-4125P available from SHIN-A T&C and Epon 872 available from Hexion (Columbus, OH).

In some embodiments, the epoxy compositions of the present disclosure may include epoxy resin in an amount of between 5 wt. % and 30 wt. %, 5 wt. % and 20 wt. %, 7 wt. % and 14 wt. %, (or may be even higher (up to 40%, 44%, 50%, or 55%) for curable compositions that do not include fillers), based on the total weight of the curable composition.

In some embodiments, the thiol composition may include one or more multifunctional, functional thiol containing compounds. As used herein, a thiol refers to an organosulfur compound that contains a carbon-bonded sulfhydryl or mercapto (—C—SH) group. In some embodiments, the multifunctional, functional thiol containing compounds may include at least two functional thiols. In some embodiments, one or more of the functional thiols in the multifunctional, functional thiol containing compounds may be a terminal thiol. In some embodiments, the multifunctional, functional thiol containing compounds may include an ether in the backbone thereof. In some embodiments, in additional to functional thiols, the multifunctional, functional thiol containing compounds may include, for example, one or more alcohol or amine functional groups. In some embodiments, the multifunctional, functional thiol can be a di-functional thiol, tri-functional thiol, tetra-functional thiol, or a polyfunctional thiol.

In some embodiments, the multifunctional, functional thiol containing compound may has a thiol functionality of 2 to 10 and comprises a reaction product of components comprising:

a) $HSR_1O(CH_2CHR_2O)_nR_1SH$
   wherein:
   each $R_1$ independently represents an alkylene group having from 2 to 12 carbon atoms,
   each $R_2$ independently represents H or $CH_3$, and
   n represents an integer from 1 to 20;

b) epoxy resin, the epoxy resin including aliphatic epoxy containing aliphatic chain having from 1 to 18 carbon atoms, bisphenol epoxy, where bisphenol epoxy may include bisphenol A epoxy, bisphenol F epoxy, bisphenol S epoxy, halogenated bisphenol epoxy, or combinations thereof; and c) an optional crosslinker, wherein the crosslinker comprising multifunctional thiol or multifunctional amine.

In some embodiments, the suitable crosslinker of the multifunctional, functional thiol containing compound may include those structural formula:

$$R_{13}\text{-}(R_{14}\text{—}SH)_x$$

where $R_{13}$ and $R_{14}$, independently, are aliphatic chain, X is 2 to 10. In some embodiments, the multifunctional thiol compound include polyether thiol GPM800 available from Gabriel Chemical (Akron, OH), trimethylol-propane-tri(3-mercapto-propionate) available from Bruno Bock (Marschacht, Germany), pentaerythritol-tetra(3-mercapto-propionate) available from Bruno Bock (Marschacht, Germany), di-Pentaerythritolhexakis(3-mercaptopropionate) available from Bruno Bock (Marschacht, Germany), Tris[2-(3-mercaptopropionyloxy)ethyl]isocyanurate available from Bruno Bock (Marschacht, Germany), trimethylol-propane-tri(2-mercapto-propionate) available from Showa Denko (Japan), Tris[2-(2-mercaptopropionyloxy)ethyl]isocyanurate available from Showa Denko (Japan).

In some embodiments, the suitable multifunctional amine compound may include those structural formula:

$$H_2N\text{—}R_{15}\text{—}NH_2$$

where $R_{15}$ is selected from aryl group or aliphatic group. Suitable aryl group usually have 6 to 12 carbon atoms such as a phenyl or biphenyl group. Suitable aliphatic group usually have 1-30 carbon atoms with straight or branched chain alkenyl, alkyl, or alkynyl which may or may not be interrupted or substituted by one or more heteroatoms such as O, N, or S.

In some embodiments, the multifunctional amine compound include m-Xylylenediamine available from Mitsubishi Gas Chemical (Japan), 1,3-Bis(aminoethyl)cyclohexane available from Mitsubishi Gas Chemical (Japan), Isophorondiamine available from Evonik (Essen, Germany), Trimethylhexamethylenediamine available from Evonik (Essen, Germany), 4,4'-diaminodicyclohexylmethane available from Evonik (Essen, Germany), Triethylenetetramine available from TCI (Shanghai, China), Tetraethylene pentaamine available from TCI (Shanghai, China), 1,8-Diamino-3,6-dioxaoctane available from Hunstman (The Woodlands, TX, US), polyether amine D230 available from Hunstman (The Woodlands, TX, US) or EC130 available from BASF (Shanghai, China).

In some embodiments, the crosslinker may be present in the multifunctional, functional thiol containing compound in an amount of between 0 wt. % and 30 wt. %, based on the total weight of the multifunctional, functional thiol containing compound.

In some embodiments, the multifunctional, functional thiol containing compound may include a compound represented by the following formulas:

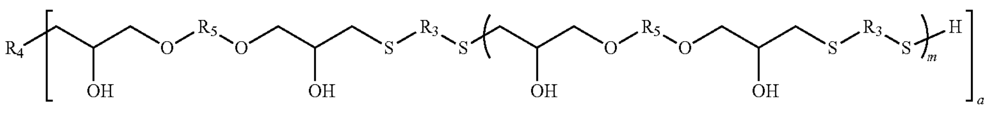

wherein, independently, $R_3$ being $R_1O(CH_2CHR_2O)_nR_1$;

$R_4$ being a branched aliphatic chain containing 2 to 18 sulfur or nitrogen junctions and a being 2 to 10; or $R_4$ being $HSR_1O(CH_2CHR_2O)_nR_1S$ and a being 1;

$R_5$ being bisphenol A, or bisphenol F, or bisphenol S, or biphenyl, or halogenated bisphenol or aliphatic chain having from 1 to 18 carbon atoms; and m being 0 to 18.

In some embodiments, the multifunctional, functional thiol containing compound according to the present disclosure may include branched aliphatic chain containing 2 to 10 sulfur or nitrogen junctions, and n is 2 to 10. Generally, the junctions may act to increase the strength of the curable composition. Suitable branched aliphatic chain source according to the present disclosure may include multifunctional thioether linkage, multifunctional amine linkage, or a combination thereof.

Examples of suitable commercially available multifunctional, functional thiol containing compounds include those available under the trade designation Cardolite NT-1888 available from Cardolite (Zhuhai, China).

In some embodiments, the multifunctional, functional thiol containing compounds may be used alone or as a mixture of two or multiple different thiol-functionalized compounds. In some embodiments, the multifunctional, functional thiol containing compounds of the thiol composition may be liquid (e.g., a viscous liquid having a viscosity of about 500-50,000 cP) at room temperature.

In some embodiments, the epoxy and thiol compositions may be present in the curable compositions based on stoichiometric ratios of the functional groups of the respective components. Employing such relative amounts may be advantageous in that it can reduce the amount of residual unreacted thiol or epoxy in the cured composition, which residual components can migrate or provide environmental or health challenges.

In some embodiments, the curable compositions of the present disclosure may be provided (e.g., packaged) as a two-part composition, in which a first part includes the epoxy composition (hereinafter "the first part") and a second part includes the thiol composition (hereinafter "the second part"). In some embodiments, the first part may include epoxy resin in an amount of at least 10 wt. %, at least 14 wt. %, at least 28 wt. %, at least 40 wt. %; or between 10 and 60 wt. %, between 14 and 50 wt. %, or between 28 and 40 wt. %, based on the total weight of the filled first part. In some embodiments, the second part may include multifunctional, functional thiol containing compounds in an amount of at least 10 wt. %, at least 14 wt. %, at least 28 wt. %, or at least 40 wt. %; or between 10 and 60 wt. %, between 14 and 50 wt. %, or between 28 and 40 wt. %, based on the total weight of the filled second part. In some embodiments, the curable composition may include epoxy resin in an amount of at least 10 wt. %, at least 20 wt. %, at least 30 wt. %, or at least 40 wt. %; or between 10 and 60 wt. %, between 14 and 50 wt. %, or between 28 and 40 wt. %, based on the total weight of the filled curable composition. In some embodiments, the curable composition may include multifunctional, functional thiol containing compounds in an amount of at least 10 wt. %, at least 20 wt. %, at least 30 wt. %, or at least 40 wt. %; or between 10 and 60 wt. %, between 14 and 50 wt. %, or between 28 and 40 wt. %, based on the total weight of the filled curable composition.

In addition to the above-described materials, the first part and the second part may, independently, include one or more additives such as inorganic fillers, coupling agents, tougheners, dispersants, catalysts, antioxidants, optional crosslinker, and the like, which are described in further detail below. The present disclosure further provides a dispenser comprising a first chamber and a second chamber. The first chamber comprises the first part, and the second chamber comprises the second part.

In some embodiments, the curable compositions may include one or more inorganic fillers (e.g. thermally conductive inorganic fillers). Inorganic fillers may be provided to the curable compositions via the first part, the second part, both parts, or following mixing of the first and second parts. Generally, the selection and loading levels of the inorganic fillers may be used to control the thermal conductivity of the curable composition. In some embodiments, inorganic filler loadings may be at least 40 wt. %, at least 50 wt. %, at least 60 wt. %, at least 70 wt. %, at least 80 wt. %, at least 90 wt %, based on the total weight of the curable composition. In some embodiments, inorganic filler loadings may be between 40 and 90 wt. %, between 40 and 80 wt. %, between 50 and 70 wt. %, or between 60 and 65 wt. %, based on the total weight of the curable composition. The loading levels of the inorganic fillers could be expressed by both volume percent (based on the total volume of any or all of the epoxy composition, the thiol composition, or the curable composition) and weight percent (based on the total weight of any or all of the epoxy composition, the thiol composition, or the curable composition). The conversion between volume percent and weight percent of fillers can be represented by following formula:

$$\text{vol. }\%_{filler} = \frac{\dfrac{\text{wt. }\%_{filler}}{\rho_{filler}}}{\dfrac{\text{wt. }\%_{filler}}{\rho_{filler}} + \dfrac{\text{wt. }\%_{resin}}{\rho_{resin}}}$$

wherein vol. $\%_{filler}$ is volume percent of the filler;

wt. $\%_{filler}$ and wt. $\%_{resin}$, and the like are weight percent of the filler, resin and the like respectively;

$\rho_{filler}$ and $\rho_{resin}$, and the like are density of the filler, resin and the like respectively.

Generally, any known thermally conductive fillers may be used, although electrically insulating fillers may be preferred where breakthrough voltage is a concern. Suitable electrically insulating, thermally conductive fillers include ceramics such as oxides, hydroxides, oxyhydroxides, silicates, borides, carbides, and nitrides. Suitable ceramic fillers include, e.g., silicon oxide, aluminum oxide, aluminum trihydroxide (ATH), boron nitride, silicon carbide, and beryllium oxide. In some embodiments, the thermally conductive filler includes ATH. It is to be appreciated that while ATH is not generally used in the polyurethane based compositions commonly employed in thermal management materials because of its reactivity with isocyanate species and the resultant formulation difficulties, the curable compositions of the present disclosure are able to incorporate such inorganic fillers without drawback. Other thermally conducting fillers include carbon-based materials such as graphite and metals such as aluminum and copper.

Thermally conductive filler particles are available in numerous shapes, e.g. spheres, irregular, platelike, & acicular. Through-plane thermal conductivity may be important in certain applications. Therefore, in some embodiments, generally symmetrical (e.g., spherical or semi-spherical) fillers may be employed. To facilitate dispersion and increase filler loading, in some embodiments, the thermally conductive fillers may be surface-treated or coated. Generally, any known surface treatments and coatings may be suitable, including those based on silane, titanate, zirconate, aluminate, and organic acid chemistries. For powder handling purposes, many fillers are available as polycrystalline agglomerates or aggregates with or without binder. To facilitate high thermal conductivity formulations, some embodiments may include mixtures of particles and agglomerates in various size and mixtures.

In some embodiments, the curable compositions of the present disclosure may include one or more silane coupling agents. Silane coupling agents were discovered to meaningfully improve overlap shear strength, after aging, of the cured curable compositions. In some embodiments, silane coupling agents may be provided to the curable compositions via the first part, the second part, both parts, or following mixing of the first and second parts. Suitable silane coupling agents may include silane thiols, silane amines (e.g., silane secondary amines), or silane epoxies.

In some embodiments, suitable silane coupling agents may include those described in E. P. Plueddemann, *Silane Coupling Agents,* 2nd ed., Springer US, New York, 1991, which is herein incorporated by reference in its entirety. In some embodiments, suitable silane coupling agents may be described as organosilicone compounds having two functional groups with different reactivity—one of the two functional groups react with inorganic materials and the other generally reacts with organic materials. In some embodiments, the silane coupling agents may have the following general structural formula:

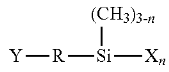

where Y is a functional group that is compatible with, or links with, organic materials, e.g. a vinyl, epoxy, amino, thiol, isocyanate group, or the like; R is an aliphatic group (typically, an aliphatic group having from 2-6 carbon atoms); and X is a functional group that undergoes hydrolysis by water or moisture to form silanol (e.g., a chlorine, alkoxy, or acetoxy group), and n is 1-3 or 1-2.

Example of suitable silane coupling agents include 3-glycidoxypropyltriethoxysilane, 5,6-epoxyhexyltriethoxysilane, 2-(3,4-epoxycyclohexyl)ethyltriethoxysilane, gamma-mercaptopropyltrimethoxysilane, mercaptoproyltriethoxysilane, s-(octanoyl)mercaptopropyltriethoxysilane, hydroxy(polyethyleneoxy)propyltriethoxysilane, N-(n-butyl)-3-aminopropyltrimethoxysilane, or combinations thereof.

In some embodiments, the first part may include a silane epoxy and the second part may include either or both of a silane thiol and a silane amine.

In some embodiments, silane coupling agents may be present in the curable composition in an amount of at least 0.1 wt. %, at least 10 wt. %, or at least 15 wt. %; or between 0.1 and 60 wt. %, between 9 and 20 wt. %, or between 14 and 17 wt. %, based on the total weight of the unfilled curable composition. In some embodiments, silane coupling agents may be present in the first part in an amount of at least 0.1 wt. %, at least 15 wt. %, or at least 20 wt. %; or between 50 and 90 wt. %, between 60 and 80 wt. %, or between 65 and 70 wt. %, based on the total weight of the unfilled first part. In some embodiments, silane coupling agents may be present in the second part in an amount of at least 0.1 wt. %, at least 5 wt. %, or at least 10 wt. %; or between 0.1 and 40 wt. %, between 5 and 16 wt. %, or between 9 and 11 wt. %, based on the total weight of the unfilled second part.

In some embodiments, the curable compositions according to the present disclosure may include one or more catalysts. Generally, the catalysts may act to accelerate the cure of the curable composition. Suitable catalysts according to the present disclosure may include basic catalysts, Lewis acid catalysts, or a combination thereof.

In some embodiments, the suitable basic catalyst may include nitrogen-containing catalysts. In some embodiments, the nitrogen-containing catalysts may include amine-containing catalysts. In some embodiments, the amine-containing catalyst comprising a tertiary amine and a primary amine in the backbone. In some embodiments, the amine-containing catalysts may include at least one group of formula —$NR_{21}R_{22}$, where $R_{21}$ and $R_{22}$ are, independently, selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl group usually have 6 to 12 carbon atoms such as a phenyl or biphenyl group. Suitable alkylaryl group can include the same aryl and alkyl groups discussed above. In some embodiments, the amine-containing catalysts may be an imidazole, an imidazole-salt, and imidazoline, or a combination thereof. Aromatic tertiary amines may also be used as a catalyst, including those having the structure formula:

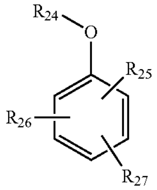

Where $R_{24}$ is hydrogen or an alkyl group; $R_{25}$, $R_{26}$ and $R_{27}$ are, independently, hydrogen or $CHNR_{28}R_{29}$, wherein at least one of $R_{25}$, $R_{26}$ and $R_{27}$ is $CHNR_{28}R_{29}$, and $R_{28}$ and $R_{29}$ are, independently, alkyl groups. In some embodiments, the alkyl groups of $R_{25}$, $R_{28}$, and/or $R_{29}$ are methyl or ethyl groups. In some embodiments, the amine-containing catalysts may include tris-2,4,6-(dimethylaminomethyl)phenol, commercially available under the tradename ANCAMINE K54 from Evonik Corporation (Parsippany, NJ), as the structural formula:

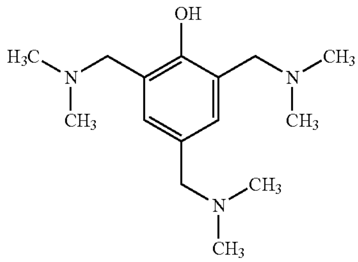

In some embodiments, the nitrogen-containing catalysts may include cyclic or bridged nitrogen containing compounds, including amidine compounds such as 1,5-diaza-bicyclo[4.3.0]non-5-ene (DBN) and 1,8-diaza-bicyclo [5.4.0]undec-7-ene (DBU), and also diazabicyclo[2.2.2] octane (DABCO) from Sigma Aldrich (Saint Louis, MO, US) with the structural formula:

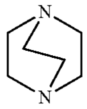

In some embodiments, the nitrogen-containing catalysts may include reactive functional group such as primary or secondary amine group, including those having the structure formula:

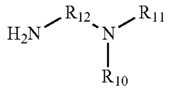

where $R_{10}$ and $R_{11}$ are, independently, selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. $R_{12}$ is aryl or aliphatic chain having from 1 to 18 carbon atoms. Suitable aryl group usually have 6 to 12 carbon atoms such as a phenyl or biphenyl group. Suitable alkylaryl group can include the same aryl and alkyl groups discussed above.

In some embodiments, the amine-containing catalysts may include 3-(Dimethylamino)-1-propylamine as the structural formula, commercially available from TCI Corporation (Shanghai, China):

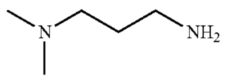

In some embodiments, the catalysts may be present in the curable composition (or either or both of the first part and the second part) in an amount between 100 and 10,000 ppm or 200 and 5,000 ppm, based on the total weight or volume of any or all of the unfilled curable composition, the unfilled first part, or the unfilled second part. It was discovered that use of cyclic-type nitrogen containing catalysts (such as DABCO) can meaningfully reduce the cure time of the curable compositions of the present disclosure (e.g., by up to 6 times) relative to cure times using non-cyclic nitrogen containing catalysts (such as K54).

In some embodiments, basic catalysts may be present in the curable composition in an amount of at least 1 wt. %, at least 2 wt. %, or at least 3 wt. %; or between 1 and 20 wt. %, between 2 and 10 wt. %, or between 3 and 5 wt. %, based on the total weight of the unfilled curable composition. In some embodiments, the second part may include a basic catalyst. In some embodiments, basic catalysts may be present in the second part in an amount of at least 0.5 wt. %, at least 5 wt. %, or at least 7 wt. %; or between 0.5 and 30 wt. %, between 5 and 15 wt. %, or between 7 and 10 wt. %, based on the total weight of the unfilled second part. In some embodiments, the second part may include a Lewis acid catalyst. In some embodiments, Lewis acid catalyst may be present in the curable composition in an amount of at least 1 wt. %, at least 2 wt. %, or at least 3 wt. %; or between 1 and 20 wt. %, between 2 and 10 wt. %, or between 3 and 5 wt. %, based on the total weight of the unfilled curable composition. In some embodiments, Lewis acid catalysts may be present in the second part in an amount of at least 0.5 wt. %, at least 5 wt. %, or at least 7 wt. %; or between 0.5 and 30 wt. %, between 5 and 15 wt. %, or between 7 and 10 wt. %, based on the total weight of the unfilled second part.

In some embodiments, the curable compositions according to the present disclosure may include one or more dispersants. Generally, the dispersants may act to stabilize the inorganic filler particles in the composition—without dispersant, the particles may aggregate, thus adversely affecting the benefit of the particles in the composition. Suitable dispersants may depend on the specific identity and surface chemistry of filler. In some embodiments, suitable dispersants according to the present disclosure may include at least a binding group and a compatibilizing segment. The binding group may be ionically bonded to the particle surface. Examples of binding groups for alumina particles include phosphoric acid, phosphonic acid, sulfonic acid, carboxylic acid, and amine. The compatibilizing segment may be selected to be miscible with the curable matrix. For epoxy resin matrices, useful compatibilizing agents may include polyalkylene oxides, e.g., polypropylene oxide, polyethylene oxide, as well as polycaprolactones, and combinations thereof. Commercially available examples include BYK W-9010 (BYK Additives and Instruments), BYK W-9012 (BYK Additives and Instruments), Disberbyk 180 (BYK Additives and Instruments), and Solplus D510 (Lubrizol Corporation). In some embodiments, the dispersants may be present in the curable composition in an amount between 0.1 and 10 wt. %, 0.1 and 5 wt. %, 0.5 and 3 wt. %, or 0.5 and 2 wt. %, based on the total weight of the filled curable composition.

In some embodiments, the dispersant may be pre-mixed with the inorganic filler prior to incorporating into any or all of the first part, the second part, or the curable composition. Such pre-mixing may facilitate the filled systems behaving like Newtonian fluids or enable shear-thinning effects behavior.

In some embodiments, the curable compositions according to the present disclosure may include one or more crosslinkers. In some embodiments, the suitable crosslinker of curable compositions may include multifunctional amine compound.

In some embodiments, the suitable multifunctional amine compound may include those structural formula:

$$H_2N—R_{15}—NH_2$$

where $R_{15}$ is selected from aryl group or aliphatic group. Suitable aryl group usually have 6 to 12 carbon atoms such as a phenyl or biphenyl group. Suitable aliphatic group usually have 1-30 carbon atoms with straight or branched chain alkenyl, alkyl, or alkynyl which may or may not be interrupted or substituted by one or more heteroatoms such as O, N, or S.

In some embodiments, the multifunctional amine compound include m-Xylylenediamine available from Mitsubishi Gas Chemical (Japan), 1,3-Bis(aminoethyl)cyclohexane available from Mitsubishi Gas Chemical (Japan), Isophorondiamine available from Evonik (Essen, Germany), Trimethylhexamethylenediamine available from Evonik (Essen, Germany), 4,4'-diaminodicyclohexylmethane available from Evonik (Essen, Germany), Triethylenetetramine available from TCI (Shanghai, China), Tetraethylene pentaamine available from TCI (Shanghai, China), 1,8-Diamino-3,6-dioxaoctane available from Hunstman (The Woodlands, TX, US), polyether amine D230 available from Hunstman (The Woodlands, TX, US) or EC130 available from BASF (Shanghai, China).

In some embodiments, the crosslinker may be present in the curable composition in an amount of between 0 wt. % and 18 wt. %, or 0 wt. % and 15 wt. %, or 0 wt. % and 10 wt. %, or 0 wt. % and 5 wt. %, based on the total weight of the filled curable composition.

In addition to the above discussed additives, further additives can be included in one or both of the first and second parts. For example, any or all of antioxidants/stabilizers, colorants, abrasive granules, thermal degradation stabilizers, light stabilizers, conductive particles, core-shell tougheners, tackifiers, flow agents, bodying agents, flatting agents, inert fillers, binders, blowing agents, fungicides, bactericides, surfactants, plasticizers, flame retardants, and other additives known to those skilled in the art. These additives, if present, are added in an amount effective for their intended purpose.

In some embodiments, upon curing, the curable compositions of the present disclosure may exhibit thermal, mechanical, and rheological properties that render the compositions particularly useful as thermally conductive gap fillers. For example, it is believed that that curable compositions of the present disclosure provide an optimal blend of tensile strength, elongation at break, and overlap shear strength (even after aging) for certain EV battery assembly applications.

In some embodiments, the cured compositions may have an elongation at break that ranges from 0.1 to 300%, 0.1 to 100%, 0.5 to 80%, 1 to 50%, or 8 to 15%, with the pulling rate between 0.8 and 1.5 mm/min for fully cured systems (for purposes of the present application, elongation at break values are as measured in accordance with ASTM D638-14, "Standard Test Method for Tensile Properties of Plastics."); or at least 1%, at least 3%, at least 7%, at least 10%, at least 15% with the pulling rate between 0.8 and 1.5 mm/min for fully cured systems.

In some embodiments, the cured compositions may have an overlap shear strength on a bare aluminum substrate ranging from 1-30 $N/mm^2$, 1-25 $N/mm^2$, 3-20 $N/mm^2$, 4-20 $N/mm^2$, 6-20 $N/mm^2$, 2-16 $N/mm^2$, or 3-8 $N/mm^2$, for fully cured systems (for purposes of the present application, overlap sheer strength values are as measured on untreated aluminum substrates (i.e., aluminum substrates having no surface treatments or coatings other than native oxide layers) according to the procedures of ASTM D1002-01, "Standard Test Method for Apparent Shear Strength of Single-Lap-Joint Adhesively Bonded Metal Specimens by Tension Loading (Metal-to-Metal))."

In some embodiments, the curable composition has, upon curing, (i) an elongation at break of equal or greater than 9%, and (ii) an overlap shear strength, on untreated aluminum, of 3-20 $N/mm^2$.

In some embodiments, the cured compositions may have a tensile strength ranging from 0.5-16 $N/mm^2$, 1-10 $N/mm^2$, or 2-8 $N/mm^2$, with the pulling rate between 0.8 and 1.5 mm/min for fully cured systems (for purposes of the present application, tensile strength values are as measured in accordance with ASTM D638-14, "Standard Test Method for Tensile Properties of Plastics.").

In some embodiments, upon curing, the curable compositions of the present disclosure may have a thermal conductivity ranging from 1.0 to 5 W/(m*K), 1.0 to 2 W/(m*K), or 1.5 to 1.8 W/(m*k) (for purposes of the present application, thermal conductivity values are as determined by, first, measuring diffusivity according to ASTM E1461-13, "Standard Test Method for Thermal Diffusivity by the Flash Method" and, then, calculating thermal conductivity from the measured thermal diffusivity, heat capacity, and density measurements according the formula:

$$k=\alpha \cdot cp \cdot \rho,$$

where k is the thermal conductivity in W/(m K), $\alpha$ is the thermal diffusivity in $mm^2/s$, cp is the specific heat capacity in J/K-g, and $\rho$ is the density in $g/cm^3$. The sample thermal diffusivity can be measured using a Netzsch LFA 467 "HYPERFLASH" directly and relative to standard, respectively, according to ASTM E1461-13. Sample density can be measured using geometric methods, while the specific heat capacity can measured using Differential Scanning calorimetry.)

In some embodiments, within 10 minutes of mixing of the first part and the second part, the viscosity of curable/partially cured composition measured at room temperature may range from 100 to 50000 poise, and at 60° C. may range from 100 to 50000 poise. Further regarding viscosity, the viscosity of the epoxy composition (prior to mixing) measured at room temperature may range from 100 to 100000 poise, and at 60° C. may range from 10 to 10000 poise; and the viscosity of the thiol composition (prior to mixing) measured at room temperature may range from 100 to 100000 poise, and at 60° C. may range from 10 to 10000 poise (for purposes of the present application, viscosity values are as measured using a 25 mm parallel-plate geometry at 1% strain on a ARES Rheometer (TA Instruments, New Castle, DE, USA) equipped with a forced convection oven accessory, at angular frequencies ranging from 10-500 rad/s.)

The present disclosure is further directed to methods of making the above-described curable compositions. In some embodiments, the curable compositions of the present disclosure may be prepared by, first, mixing the components of the first part (including any additives) and, separately, mixing the components of the second part (including any additives). The components of both the first and second parts may be mixed using any conventional mixing technique, including by use of a speed mixer. In embodiments in which dispersants are employed, the dispersant may be pre-mixed with the inorganic filler prior to incorporating into the composition. Next, the first and second parts may be mixed together using any conventional mixing technique to form the curable composition.

In some embodiments, the curable compositions of the present disclosure may be capable of curing without the use of catalyst or other cure agents. Generally, the curable compositions may cure at typical application conditions, e.g., at room temperature without the need for elevated temperatures or actinic radiation (e.g., ultraviolet light). In some embodiments, the first curable compositions cure at no greater than room temperature.

In some embodiments, the curable compositions of the present disclosure may be provided as a two-part composition. Generally, the two components of a two-part composition may be mixed prior to being applied to the substrates to be bonded. After mixing, the two-part composition may reach a desired handling strength, and ultimately achieve a desired final strength. Applying the curable composition can be carried out, for example, by dispensing the curable composition from a dispenser comprising a first chamber, a second chamber, and a mixing tip, wherein the first chamber comprises the first part, wherein the second chamber comprises the second part, and wherein the first and second chambers are coupled to the mixing tip to allow the first part and the second part to flow through the mixing tip.

The curable compositions of the present disclosure may be useful for coatings, shaped articles, adhesives (including structural and semi-structural adhesives), magnetic media, filled or reinforced composites, caulking and sealing compounds, casting and molding compounds, potting and encapsulating compounds, impregnating and coating compounds, conductive adhesives for electronics, protective coatings for electronics, as primers or adhesion-promoting layers, and other applications that are known to those skilled in the art. In some embodiments, the present disclosure provides an article comprising a substrate, having a cured coating of the curable composition thereon.

In some embodiments, the curable composition may function as a structural adhesive, i.e. the curable composition is capable of bonding a first substrate to a second substrate, after curing. Generally, the bond strength (e.g. peel strength, overlap shear strength, or impact strength) of a structural adhesive continues to build well after the initial cure time. In some embodiments, the present disclosure provides an article comprising a first substrate, a second substrate and a cured composition disposed between and adhering the first substrate to the second substrate, wherein the cured composition is the reaction product of the curable composition according to any one of the curable compositions of the present disclosure. In some embodiments, the first and/or second substrate may be at least one of a metal, a ceramic and a polymer, e.g. a thermoplastic.

The curable compositions may be coated onto substrates at useful thicknesses ranging from 5 microns to 10000 microns, 25 micrometers to 10000 micrometers, 100 micrometers to 5000 micrometers, or 250 micrometers to 1000 micrometers. Useful substrates can be of any nature and composition, and can be inorganic or organic. Representative examples of useful substrates include ceramics, siliceous substrates including glass, metal (e.g., aluminum or steel), natural and man-made stone, woven and nonwoven articles, polymeric materials, including thermoplastic and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

In another aspect, the present disclosure provides a coated article comprising a metal substrate comprising a coating of the uncured, partially cured or fully cured curable composition on at least one surface thereof. If the substrate has two major surfaces, the coating can be coated on one or both major surfaces of the metal substrate and can comprise additional layers, such as bonding, tying, protective, and topcoat layers. The metal substrate can be, for example, at least one of the inner and outer surfaces of a pipe, vessel, conduit, rod, profile shaped article, sheet or tube.

Figure 2:
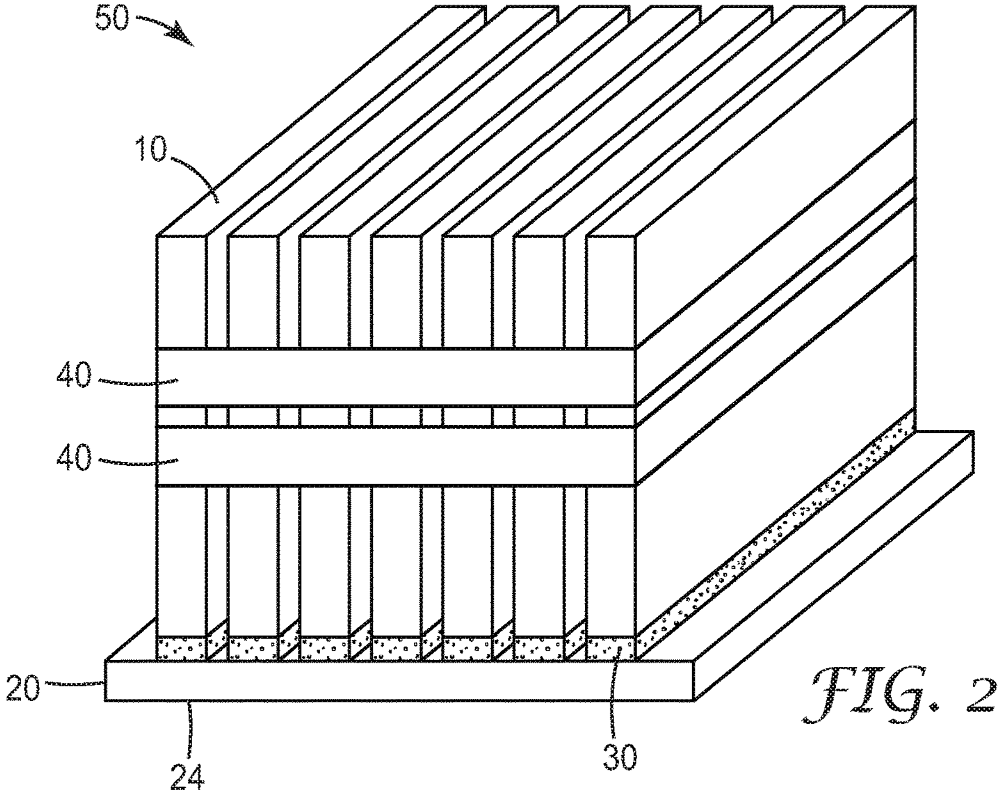
FIG. 2 illustrates the assembled battery module corresponding to FIG. 1.

In some embodiments, the present disclosure is further directed to a battery module that includes the uncured, partially cured or fully cured curable compositions of the present disclosure. Components of a representative battery module during assembly are shown in FIG. 1, and an assembled battery module is shown in FIG. 2. Battery module 50 may be formed by positioning a plurality of battery cells 10 on first base plate 20. Generally, any known battery cell may be used including, e.g., hard case prismatic cells or pouch cells. The number, dimensions, and positions of the cells associated with a particular battery module may be adjusted to meet specific design and performance requirements. The constructions and designs of the base plate are well-known, and any base plate (typically metal base plates made of aluminum or steel) suitable for the intended application may be used.

Battery cells 10 may be connected to first base plate 20 through first layer 30 of a first curable composition according to any of the embodiments of the present disclosure. First layer 30 of the curable composition may provide first level thermal management where the battery cells are assembled in a battery module. As a voltage difference (e.g., a voltage difference of up to 2.3 Volts) is possible between the battery cells and the first base plate, breakthrough voltage may be an important safety feature for this layer. Therefore, in some embodiments, electrically insulating fillers like ceramics (typically alumina and boron nitride) may be preferred for use in the curable compositions.

In some embodiments, layer 30 may comprise a discrete pattern of the first curable composition applied to first surface 22 of first base plate 20, as shown in FIG. 1. For example, a pattern of the material to the desired lay-out of the battery cells may be applied, e.g., robotically applied, to the surface of the base plate. In some embodiments, the first layer may be formed as a coating of the first curable composition covering all or substantially all of the first surface of the first base plate. In alternative embodiments, the first layer may be formed by applying the curable composition directly to the battery cells and then mounting them to the first surface of the first base plate.

In some embodiments, the curable composition may need to accommodate dimensional variations of up to 2 mm, up to 4 mm, or even more. Therefore, in some embodiments, the first layer of the first curable composition may be at least 0.05 mm thick, e.g., at least 0.1 mm, or even at least 0.5 mm thick. Higher breakthrough voltages may require thicker layers depending on the electrical properties of the material, e.g., in some embodiments, at least 1, at least 2, or even at least 3 mm thick. Generally, to maximize heat conduction through the curable composition and to minimize cost, the curable composition layer should be as thin as possible, while still ensure good contact with the heat sink. Therefore, in some embodiments, the first layer is no greater than 5 mm thick, e.g., no greater than 4 mm thick, or even no greater than 2 mm thick.

As the first curable composition cures, the battery cells are held more firmly in-place. When curing is complete, the battery cells are finally fixed in their desired position, as illustrated in FIG. 2. Additional elements, such as bands 40 may be used to secure the cells for transport and further handling.

Generally, it is desirable for the curable composition to cure at typical application conditions, e.g., without the need for elevated temperatures or actinic radiation (e.g., ultraviolet light). In some embodiments, the first curable composition cures at room temperature, or no greater than 30° C., e.g., no greater than 25° C., or even no greater than 20° C.

In some embodiments, the time to cure is no greater than 60 minutes, e.g., no greater than 40 minutes, or even no greater than 20 minutes. Although very rapid cure (e.g., less than 5 minutes or even less than 1 minute) may be suitable for some applications, in some embodiments, an open time of at least 5 minutes, e.g., at least 10 minutes, or even at least 15 minutes may be desirable to allow time for positioning and repositioning of the battery cells. Generally, it is desirable to achieve the desired cure times without the use of expensive catalysts such as platinum.

Figure 3:
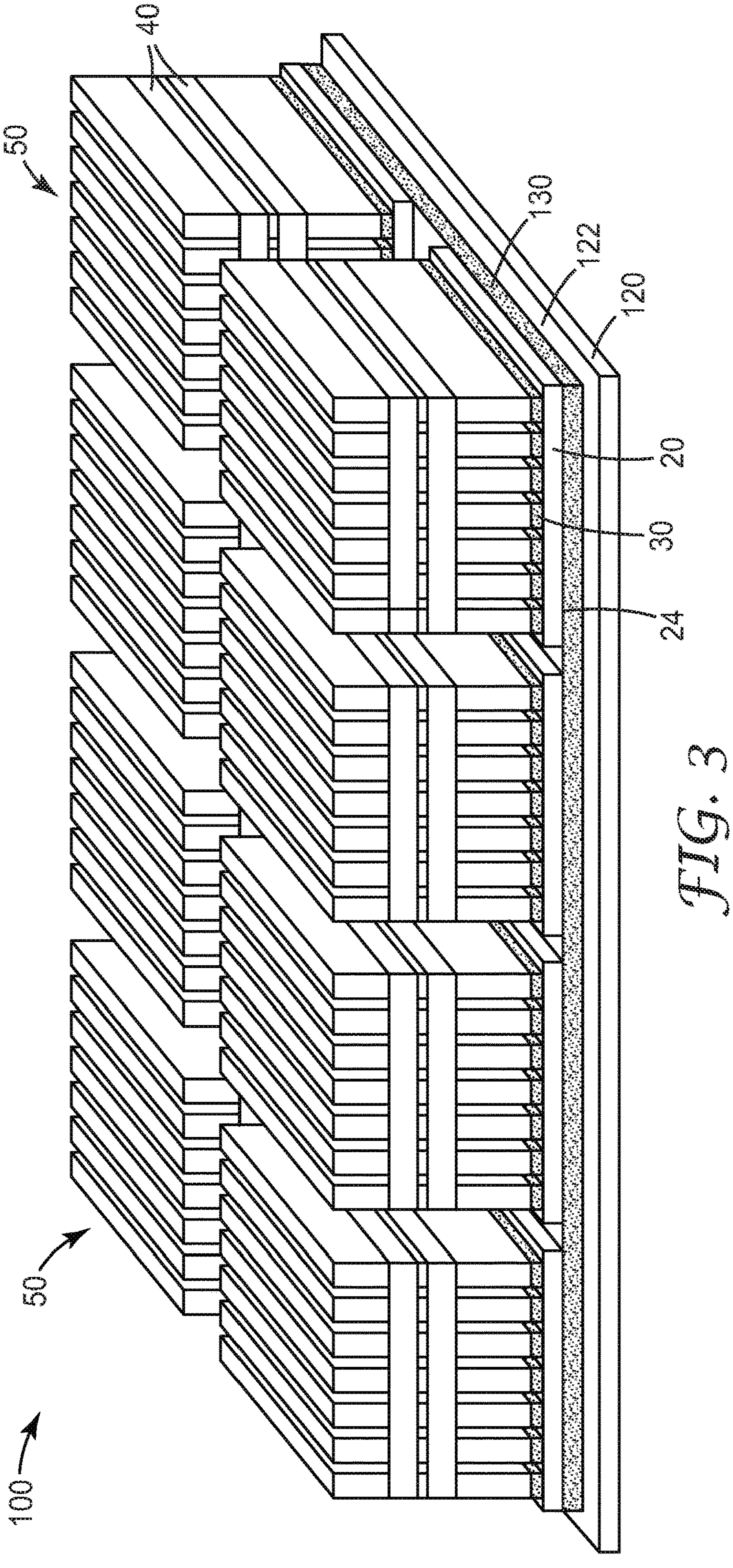
FIG. 3 illustrates the assembly of an exemplary battery subunit according to some embodiments of the present disclosure.

As shown in FIG. 3, a plurality of battery modules 50, such as those illustrated and described with respect to FIGS. 1 and 2, are assembled to form battery subunit 100. The number, dimensions, and positions of the modules associated with a particular battery subunit may be adjusted to meet specific design and performance requirements. The constructions and designs of the second base plate are well-known, and any base plate (typically metal base plates) suitable for the intended application may be used.

Individual battery modules 50 may be positioned on and connected to second base plate 120 through second layer 130 of a curable composition according to any of the embodiments of the present disclosure.

Second layer 130 of a second curable composition may be positioned between second surface 24 of first base plate 20 (see FIGS. 1 and 2) and first surface 122 of second base plate 120. The second curable composition may provide second level thermal management where the battery modules are assembled into battery subunits. At this level, breakthrough voltage may not be a requirement. Therefore, in some embodiments, electrically conductive fillers such as graphite and metallic fillers may be used or alone or in combinations with electrically insulating fillers like ceramics.

In some embodiments, the second layer 130 may be formed as coating of the second curable composition covering all or substantially all of first surface 122 of second base plate 120, as shown in FIG. 3. In some embodiments, the second layer may comprise a discrete pattern of the second curable composition applied to the surface of the second base plate. For example, a pattern of the material corresponding to the desired lay-out of the battery modules may be applied, e.g., robotically applied, to the surface of the second base plate. In alternative embodiments, the second layer may be formed by applying the second curable composition directly to second surface 24 of first base plate 20 (see FIGS. 1 and 2) and then mounting the modules to first surface 122 of second base plate 120.

The assembled battery subunits may be combined to form further structures. For example, as is known, battery modules may be combined with other elements such as battery control units to form a battery system, e.g., battery systems used in electric vehicles. In some embodiments, additional layers of curable compositions according to the present disclosure may be used in the assembly of such battery systems. For example, in some embodiments, thermally conductive gap filler according to the present disclosure may be used to mount and help cool the battery control unit.

LISTING OF EMBODIMENTS

1. A curable composition comprising:
   a first part comprising an epoxy resin; and
   a second part comprising a multifunctional, functional thiol containing compound; and
   an inorganic filler present in an amount of at least 40 weight %, based on the total weight of the curable composition
   wherein the functional thiol containing compound may has a thiol functionality of 2 to 10 and comprises a reaction product of components comprising:
   a) $HSR_1O(CH_2CHR_2O)_nR_1SH$
   wherein:
   each $R_1$ independently represents an alkylene group having from 2 to 12 carbon atoms,
   each $R_2$ independently represents H or $CH_3$, and
   n represents an integer from 1 to 20;
   b) epoxy resin, the epoxy resin including aliphatic epoxy containing aliphatic chain having from 1 to 18 carbon atoms, bisphenol epoxy, where bisphenol epoxy may include bisphenol A epoxy, bisphenol F epoxy, bisphenol S epoxy, halogenated bisphenol epoxy, or combinations thereof; and
   c) an optional crosslinker, wherein the crosslinker comprising multifunctional thiol or multifunctional amine.
2. The curable composition of embodiment 1, wherein the multifunctional, functional thiol containing compound is represented by the following formulas:

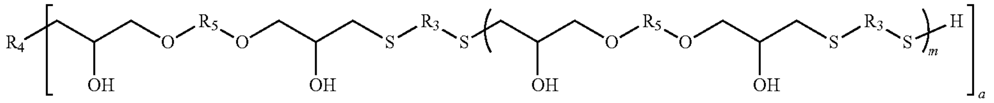

wherein, independently, $R_3$ being $R_1O(CH_2CHR_2O)_nR_1$;

$R_4$ being a branched aliphatic chain containing 2 to 18 sulfur or nitrogen junctions and a being 2 to 10; or $R_4$ being $HSR_1O(CH_2CHR_2O)_nR_1S$ and a being 1;

$R_5$ being bisphenol A, or bisphenol F, or bisphenol S, or biphenyl, or halogenated bisphenol or aliphatic chain having from 1 to 18 carbon atoms; and m being 0 to 18.

3. The curable composition of any one of the previous embodiments, wherein the epoxy resin comprises an internally flexible bisphenol epoxy resin.
4. The curable composition of embodiment 3, wherein the internally flexible bisphenol epoxy resin is represented by the following formula:

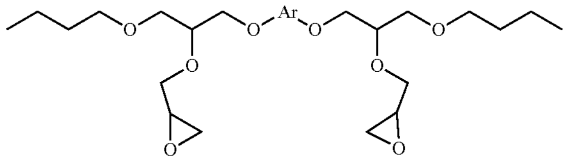

where Ar is bisphenol A, bisphenol F, bisphenol Z, or a mixture thereof.

5. The curable composition of any one of the previous embodiments, wherein the epoxy resin comprises a phosphonic acid group in the backbone thereof.
6. The curable composition of any one of the previous embodiments, wherein the epoxy resin further comprises a rigid bisphenol epoxy resin.
7. The curable composition of embodiment 6, wherein the rigid bisphenol epoxy resin is present in the curable composition in an amount of less than 50 wt. %, based on the total weight of epoxy resin.
8. The curable composition according to any one of the previous embodiments, further comprising a silane coupling agent.
9. The curable composition according to embodiment 8, wherein the silane coupling agent comprises an amine terminated silane coupling agent.
10. The curable composition according to embodiment 8, wherein the silane coupling agent comprises a mercaptan terminated silane coupling agent.
11. The curable composition according to embodiment 8, wherein the silane coupling agent comprises an epoxy terminated silane coupling agent.
12. The curable composition according to any one of the previous embodiments, further comprising a catalyst.
13. The curable composition according to embodiment 12, wherein the catalyst comprises a basic catalyst.
14. The curable composition according to embodiment 13, wherein the basic catalyst is represented by one of the following formulas:

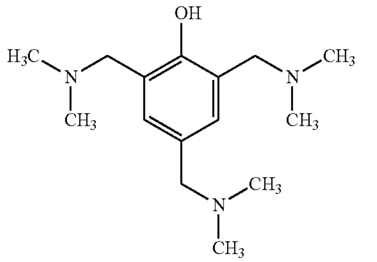

or

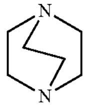

.

15. The curable composition according to embodiment 13, wherein the basic catalyst comprising a tertiary amine and a primary amine in the backbone.

16. The curable composition according to embodiment 13, wherein the basic catalyst is represented by the following formulas:

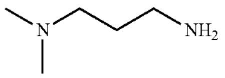

17. The curable composition according to embodiment 12, wherein the catalyst comprises a Lewis acid catalyst.
18. The curable composition according to embodiment 12, wherein the Lewis acid catalyst comprises calcium triflate, calcium nitrate, or a tin catalyst.
19. The curable composition according to any one of the previous embodiments, wherein epoxy resin is present in the curable composition in an amount of at least 20 wt. %, based on the total weight of the unfilled curable composition.
20. The curable composition according to any one of the previous embodiments, wherein multifunctional, functional thiol containing compounds are present in the curable composition in an amount of 4.9-20 wt. %, based on the total weight of the unfilled curable composition.
21. The curable composition according to any one of the previous embodiments, further comprising a multifunctional amine.
22. The curable composition according to any one of the previous embodiments, wherein the inorganic filler present in an amount of at least 50 wt. %, based on the total weight of the curable composition.
23. The curable composition according to any one of the previous embodiments, wherein the inorganic filler present in an amount of at least 60 wt. %, based on the total weight of the curable composition.
24. The curable composition according to any one of the previous embodiments, wherein the inorganic filler comprises alumina.
25. The curable composition according to any one of the previous embodiments, wherein the inorganic filler comprises spherical alumina particles or semispherical alumina particles.
26. The curable composition according to any one of the previous embodiments, wherein the inorganic filler comprises silane surface-treated particles.
27. The curable composition according to any one of the previous embodiments, wherein the inorganic filler comprises ATH.
28. The curable composition according to any one of the previous embodiments, wherein the curable composition has, upon curing, (i) an elongation at break of equal or greater than 9%, and (ii) an overlap shear strength, on untreated aluminum, of 3-20 $N/mm^2$.
29. The curable composition according to any one of the previous embodiments, wherein the curable composition has, upon curing, (i) an elongation at break of equal or greater than 15%, and (ii) an overlap shear strength, on untreated aluminum, of 3-20 $N/mm^2$.
30. The curable composition according to any one of the previous embodiments, wherein the curable composition has, upon curing, a tensile strength of 1 to 16 $N/mm^2$.
31. The curable composition according to any one of the previous embodiments, wherein the curable composition has, upon curing, a thermal conductivity of at least 1.0 W/(m*K).
32. An article comprising a cured composition, wherein the cured composition is the reaction product of the curable composition according to any one of the previous embodiments.
33. The article of embodiment 32, wherein the cured composition has a thickness between from 5 microns to 10000 microns.
34. The article of any one of embodiments 32-33, further comprising a substrate having a surface, wherein the cured composition is disposed on the surface of the substrate.
35. The article of embodiment 34, wherein the substrate is a metal substrate.
36. An article comprising a first substrate, a second substrate and a cured composition disposed between and adhering the first substrate to the second substrate, wherein the cured composition is the reaction product of the curable composition according to any one of embodiments 1-31.
37. A battery module comprising a plurality of battery cells connected to a first base plate by a first layer of the reaction product of the curable composition according to any one of embodiments 1-31.
38. A method of making a battery module comprising: applying a first layer of a curable composition according to any one of embodiments 1-31 to a first surface of a first base plate, attaching a plurality of battery cells to the first layer to connect the battery cells to the first base plate, and curing the curable composition.

EXAMPLES

Objects and advantages of this disclosure are further illustrated by the following comparative and illustrative examples. Unless otherwise noted, all parts, percentages, ratios, etc. in the examples and the rest of the specification are by weight, and all reagents used in the examples were obtained, or are available, from general chemical suppliers such as, for example, Sigma-Aldrich Corp., Saint Louis, MO, US unless otherwise specified.

Synthesis of the Multifunctional Thiol

Table 1 summarizes materials used in the multifunctional thiol.

TABLE 1

| Materials List | | | |
|---|---|---|---|
| Product Name | Description | Function | Source |
| DER331 | Bisphenol A epoxy | Epoxy | DOW Chemical (Midland, MI, US) |
| DMDO | 1,8-dimercapto-3,6-dioxaoctane | di-thiol | Arkema (Colombes Cedex) |
| PETMP | Pentaerythritol tetrakis(3-mercaptopropionate) | Thiol crosslinker | BRUNO BOCK (Marschacht, Germany) |

TABLE 1-continued

| Materials List | | | |
|---|---|---|---|
| Product Name | Description | Function | Source |
| Ancamine K54 | tris-2,4,6-(dimethylaminomethyl) phenol | catalyst | Evonik (Essen, Germany) |
| TEPA | Tetraethylene pentaamine | Amine crosslinker | TCI (Shanghai, China) |
| DMAPA | 3-(Dimethylamino)-1-propylamine | catalyst | TCI (Shanghai, China) |
| EDR-148 | 1,8-Diamino-3,6-dioxaoctane | Amine crosslinker | Hunstman (The Woodlands, TX, US) |
| XY207 | Aliphatic epoxy | Aliphatic epoxy | Xinyuan Chemical (Anhui, China) |

Thiol-1 (Synthesis of Multifunctional Thiol-1)

Thiol-1 was prepared as below. 14.5 g of DER331, 18.5 g of DMDO, 14.5 g of PETMP and 2.5 g of tris-2,4,6-(dimethylaminomethyl) phenol were added to a reactor. The mixture was stirred with an agitator (a 3-blade, backswept agitator) in the reactor at a rotational speed of about 75 rpm for 24 hours. The reactor was kept at room temperature. PETMP is a thiol crosslinker which is represented by the following formula:

$$R_{13}\text{-}(R_{14}\text{—}SH)_x$$

where x is 4.

Thiol-2 (Synthesis of Multifunctional Thiol-2)

Thiol-2 is reactive product from 23 g of DER331, 21.25 g of DMDO, 2 g of Tetraethylene pentaamine and 3.75 g of N,N-dimethylethylenediamine. The synthetic method is the same as Thiol-1. Tetraethylene pentaamine is a crosslinker which is represented by the following formula:

$$H_2N\text{—}R_{16}\text{—}NH_2$$

where $R_{15}$ is nitrogen containing aliphatic chain.

Thiol-6 (Synthesis of Multifunctional Thiol-6)

Thiol-6 is reactive product from 26.25 g of XY207, 16.75 g of DMDO, 2 g of Tetraethylene pentaamine and 5 g N,N-dimethylethylenediamine. The synthetic method is the same as Thiol-1. XY207 is an aliphatic epoxy.

Thiol-1 to Thiol-6 Comprise a Reaction Product of Components Comprising:

1. $HSR_1O(CH_2CHR_2O)\text{—}R_1SH$, wherein: each $R_1$ independently represents an alkylene group having from 2 to 12 carbon atoms, each $R_2$ independently represents H or $CH_3$, and n represents an integer from 1 to 20;
2. epoxy resin, the epoxy resin including aliphatic epoxy containing aliphatic chain having from 1 to 18 carbon atoms, bisphenol epoxy, where bisphenol epoxy may include bisphenol A epoxy, bisphenol F epoxy, bisphenol S epoxy, halogenated bisphenol epoxy, or combinations thereof; and
3. an optional crosslinker, wherein the crosslinker comprising multifunctional thiol or multifunctional amine.

Thiol-1 to Thiol-6 disclosed the synthesis method of the multifunctional, functional thiol containing compound may include a compound represented by the following formulas:

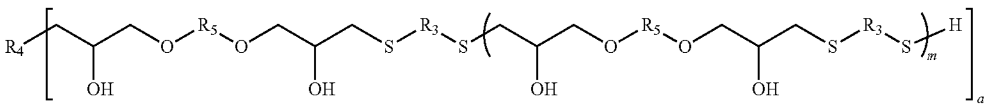

Thiol-3 (Synthesis of Multifunctional Thiol-3)

Thiol-3 is reactive product from 23 g of DER331, 21.5 g of DMDO (Arkema), 4 g of 1,8-Diamino-3,6-dioxaoctane and 2.5 g of N,N-dimethylethylenediamine. The synthetic method is the same as Thiol-1. 1,8-Diamino-3,6-dioxaoctane is a crosslinker which is represented by the following formula:

$$H_2N\text{—}R_{16}\text{—}NH_2$$

where $R_{15}$ is oxygen containing aliphatic chain.

Thiol-4 (Synthesis of Multifunctional Thiol-4)

Thiol-4 is reactive product from 23.5 g of DER331, 19 g of DMDO, 5 g of 1,8-Diamino-3,6-dioxaoctane and 2.5 g of N,N-dimethylethylenediamine. The synthetic method is the same as Thiol-1. The crosslinker is present in Thiol-4 is the same crosslinker as Thiol-3, and the amount is richer than Thiol-3.

Thiol-5 (Synthesis of Multifunctional Thiol-5)

Thiol-5 is reactive product from 21.25 g of DER331, 22.5 g of DMDO and 6.25 g of N,N-dimethylethylenediamine. The synthetic method is the same as Thiol-1. Thiol-5 doesn't contain any crosslinker.

wherein, independently, $R_3$ being $R_1O(CH_2CHR_2O)_nR_1$;

$R_4$ being a branched aliphatic chain containing 2 to 18 sulfur or nitrogen junctions and a being 2 to 10; or $R_4$ being $HSR_1O(CH_2CHR_2O)_nR_1S$ and a being 1;

$R_5$ being bisphenol A, or bisphenol F, or bisphenol S, or biphenyl, or halogenated bisphenol or aliphatic chain having from 1 to 18 carbon atoms; and m being 0 to 18.

In above formulas, $R_3$ comes from $HSR_1O(CH_2CHR_2O)_nR_1SH$; $R_4$ comes from optional crosslinker (multifunctional thiol or multifunctional amine) or difunctional thiol $HSR_1O(CH_2CHR_2O)_nR_1SH$; $R_5$ comes from epoxy resin.

The formula is one of the possible formulas of reaction compound. The reaction compound may have more complex net structure.

Sample Preparation

Table 2 summarizes materials used in the examples.

TABLE 2

| Materials List | | |
|---|---|---|
| Product Name | Function/Description | Source |
| THIOCURE TMPMP | Trimethylolpropane Tri(3-mercaptopropionate) Ester Thiol | BRUNO BOCK, Marschacht, Germany |
| GABEPRO GPM-800 LO | Low Odor Multifunctional Ether Thiol | GABRIEL Chemicals, Akron, OH, US |
| ARALDITE PY-4122 | Bisphenol-A Type Epoxy Resin | Huntsman, The Woodlands, TX, US |
| EPON 828 | Difunctional Bisphenol A/Epichlorohydrin Epoxy Resin | Hexion, Columbus, OH, US |
| EP-49-10N | Epoxy Resin | ADEKA, Tokyo Japan |
| MOLDX A110 | Alumina Trihydrate (ATH) Thermally Conductive Filler | HUBER Engineered Materials, Atlanta, GA, US |
| BAK-70 | Spherical Alumina Thermally Conductive Filler: 70 μm average particle size | BESTRY Performance Materials, Shanghai, China |
| BAK-40 | Spherical Alumina Thermally Conductive Filler: 40 μm average particle size | BESTRY Performance Materials, Shanghai, China |
| BAK-10 | Spherical Alumina Thermally Conductive Filler: 10 μm average particle size | BESTRY Performance Materials, Shanghai,China |
| MARTOXID TM-1250 | Aluminum Oxide Thermally Conductive Filler | HUBER Engineered Materials, Atlanta, GA, US |
| MARTOXID TM-2250 | Aluminum Oxide Thermally Conductive Filler | HUBER Engineered Materials, Atlanta, GA, US |
| DBU | 1,8-Diazabicyclo[5.4.0]undec-7-ene Catalyst | Alfa Aesar, Haverhill, MA, US |
| K54 | Tris-2,4,6-dimethylaminomethyl Phenol Catalyst | Sigma Aldrich Sigma-Aldrich Corp., Saint Louis, MO, US |
| DABCO | 1,4-diazabicyclo[2.2.2]octane Amine Catalyst | Sigma Aldrich Sigma-Aldrich Corp., Saint Louis, MO, US |
| DBTDL | Dibutyltin dilaurate Catalyst | Sigma Aldrich Sigma-Aldrich Corp., Saint Louis, MO, US |
| Calcium triflate | Catalyst | GFS Chemicals, Columbus, OH |
| PRIAMINE 1074 | Dimer Diamine | CRODA, Chino Hills, CA, US |
| XIAMETER OFS-6040 Silane | Silane Coupling Agent Additive | DOW Chemical,Midland,MI, US |
| DYNASYLAN 1189 | Silane Coupling Agent Additive | EVONIK Industries, Essen, Germany |
| SILQUEST A-189 | Silane Coupling Agent Additive | Momentive, Columbus, OH, US |
| CAB-O-SIL TS-720 | Fumed Silica Thixotropic Additive | CABOT, Boston, MA, US |
| AEROSIL R202 | Fumed Silica Thixotropic Additive | EVONIK Industries, Essen, Germany |
| SOLPLUS D510 | Dispersing Additive | LUBRIZOL, Wickliffe, OH, US |
| DISPERBYK 145 | Dispersing Additive | BYK-Chemie, Wesel, Germany |
| NT-1888 | Multifunctional Ether Thiol | Cardolite, Zhuhai, China |
| K-Flex 975P | Plasticizer | Kalama Chemical, WA, US |
| SE-4215P | Bisphenol-A Type Epoxy Resin | Shin-A, Seoul, Korea |
| XY207 | Aliphatic epoxy | Xinyuan Chemical, Anhui, China |

Detailed formulations of Examples 1 to 16 are listed in Tables 3 and 4.

To prepare the samples, Parts A and B were mixed individually as follows. First, the organic components were combined and mixed by hand. The thixotropic additive was then added, followed by hand mixing. A speed mixer (SPEEDMIXER DAC 400, FlackTek, Inc., Landrum, SC, US) was then used at 1500 rpm for 2 min to thoroughly mix the materials. The remaining filler materials were combined and added to the formulation in 2 portions. The addition of each portion was followed by mixing in the DAC 400 mixer at 2000 RPM for 2 min. In a final step the materials were mixed in the in DAC 400 mixer for 15 seconds at atmospheric pressure at 1500 RPM, then for two minutes at 30 Torr and 2000 RPM, and then a final 15 seconds at 1500 RPM as the pressure returned to atmospheric pressure.

Part A and Part B were mixed based on the stoichiometric ratios of the functional groups: moles of thiol groups in Part A and combined moles of epoxide groups in Part B. A pneumatic dispensing system with a static mixing nozzle was used to mix Part A and Part B in the ratios listed in Tables 3 and 4.

TABLE 3

| Composition of Examples | | | | | | | |
|---|---|---|---|---|---|---|---|
| | Ex. 1 | Ex. 2 | Ex. 3 | Ex. 4 | Ex. 5 | Ex. 6 | Ex. 7 |
| Part A | wt % | wt % | wt % | wt % | wt % | wt % | wt % |
| NT-1888 | 9.8 | 12 | 28 | 40 | 40 | 40 | 40 |
| K-Flex 975P | 2 | 2 | — | — | — | — | — |
| MOLDX A110 | — | — | — | 60 | 60 | 60 | 60 |
| BAK-10 | 17.6 | 17.4 | 14.4 | — | — | — | — |
| BAK-40 | 54.4 | 51.6 | 43.2 | — | — | — | — |
| MARTOXID TM-1250 | 16.2 | 17 | 14.4 | — | — | — | — |
| Part B | wt % | wt % | wt % | wt % | wt % | wt % | wt % |
| SE-4125P | 9.9 | 14 | 28 | 27 | 21 | 18 | 16 |
| EPON 828 | — | — | — | 10 | 15 | 18 | 20 |
| XY207 | — | — | — | 3 | 4 | 4 | 4 |
| K-Flex 975P | 1 | — | — | — | — | — | — |
| MOLDX A110 | — | — | — | 60 | 60 | 60 | 60 |
| BAK-10 | 17.8 | 17.2 | 14.4 | — | — | — | — |
| BAK-40 | 54.5 | 51.6 | 43.2 | — | — | — | — |

TABLE 3-continued

| Composition of Examples | | | | | | | |
|---|---|---|---|---|---|---|---|
| | Ex. 1 | Ex. 2 | Ex. 3 | Ex. 4 | Ex. 5 | Ex. 6 | Ex. 7 |
| MARTOXID TM-1250 | 16.8 | 17.2 | 14.4 | — | — | — | — |
| Part A:Part B (wt:wt) | 1:1 | 1:1 | 1:1 | 1:1 | 1:1 | 1:1 | 1:1 |
| Total filler (wt %) | 88.7 | 86 | 72 | 60 | 60 | 60 | 60 |

TABLE 4

| Composition of Examples | | | | | | | | | |
|---|---|---|---|---|---|---|---|---|---|
| | Ex. 8 | Ex. 9 | Ex. 10 | Ex. 11 | Ex. 12 | Ex. 13 | Ex. 14 | Ex. 15 | Ex. 16 |
| Part A | wt % | wt % | wt % | wt % | wt % | wt % | wt % | wt % | wt % |
| Thiol-1 | 12 | — | — | — | — | — | — | — | — |
| Thiol-2 | — | 12 | — | — | — | — | — | — | — |
| Thiol-3 | — | — | 12 | — | — | — | 9.8 | 40 | 28 |
| Thiol-4 | — | — | — | 12 | — | — | — | — | — |
| Thiol-5 | — | — | — | — | 12 | — | — | — | — |
| Thiol-6 | — | — | — | — | — | 12 | — | — | — |
| K-Flex 975P | 2 | 2 | — | — | — | — | 2 | — | — |
| MOLDX A110 | — | — | — | — | — | — | — | 60 | — |
| BAK-10 | 17.2 | 17.2 | 17.2 | 17.2 | 17.2 | 17.2 | 17.6 | — | 14.4 |
| BAK-40 | 51.6 | 51.6 | 51.6 | 51.6 | 51.6 | 51.6 | 54.4 | — | 43.2 |
| MARTOXID TM-1250 | 17.2 | 17.2 | 17.2 | 17.2 | 17.2 | 17.2 | 16.2 | — | 14.4 |
| Part B | wt % | wt % | wt % | wt % | wt % | wt % | wt % | wt % | wt % |
| SE-4125P | 14 | 14 | 14 | 14 | 14 | 14 | 9.9 | 16 | 28 |
| EPON 828 | — | — | — | — | — | — | — | 20 | — |
| XY207 | — | — | — | — | — | — | — | 4 | — |
| K-Flex 975P | — | — | — | — | — | — | 1 | — | — |
| MOLDX A110 | — | — | — | — | — | — | — | 60 | — |
| BAK-10 | 17.2 | 17.2 | 17.2 | 17.2 | 17.2 | 17.2 | 17.8 | — | 14.4 |
| BAK-40 | 51.6 | 51.6 | 51.6 | 51.6 | 51.6 | 51.6 | 54.5 | — | 43.2 |
| MARTOXID TM-1250 | 17.2 | 17.2 | 17.2 | 17.2 | 17.2 | 17.2 | 16.8 | — | 14.4 |
| Part A:Part B (wt:wt) | 1:1 | 1:1 | 1:1 | 1:1 | 1:1 | 1:1 | 1:1 | 1:1 | 1:1 |
| Total filler (wt %) | 86 | 86 | 86 | 86 | 86 | 86 | 88.7 | 60 | 72 |

Test Procedures

Overlap Shear Adhesion (OLS)

Two 1 inch (2.54 centimeters (cm)) wide×4 inch (10 cm) long×0.125 inch (0.32 cm) thick aluminum coupons were cleaned using methyl ethyl ketone (MEK) and otherwise left untreated. At the tip of one coupon, a 1 inch by 0.5 inch (2.54 cm×1.27 cm) rectangle was covered by the mixed thiol/epoxy paste and then laminated with another coupon in the opposite tip direction to give about 10 to 30 mils (0.25 to 0.76 millimeters (mm)) of paste between the aluminum coupons, which was clamped by a binder clip. The laminated aluminum coupons were then cured at room temperature for more than two days to give complete curing prior to overlap shear testing.

OLS tests were conducted on an INSTRON Universal Testing Machine model 1122 (INSTRON Corporation, Norwood, MA, USA) according to the procedures of ASTM D1002-01, "Standard Test Method for Apparent Shear Strength of Single-Lap-Joint Adhesively Bonded Metal Specimens by Tension Loading (Metal-to-Metal)." The crosshead speed was 0.05 inch/minute (1.27 mm/minute).

Tensile & Elongation Properties

For tensile strength & elongation tests, dog bone-shaped samples were made in accordance with ASTM D1708-13, "Standard Test Method for Tensile Properties of Plastics by Use of Microtensile Specimens" by pressing the mixed paste into a dog bone-shaped silicone rubber mold, which was then laminated with release liner on both sides. The dog bone shape gives a sample with a length of about 0.6 inch (1.5 cm) in the center straight area, a width of about 0.2 inch (0.5 cm) in the narrowest area, and a thickness of about 0.06 to about 0.1 inch (about 1.5 mm to about 2.5 cm). Samples were then cured at room temperature for 24 hours, 100° C. for 1 hour, or 120° C. for 1 hour to be fully cured prior to tensile testing. The sample was then conditioned at room temperature for 30 minutes prior to tensile & elongation testing.

Tensile strength & elongation tests were conducted on an INSTRON Universal Testing Machine model 1122 (INSTRON Corporation, Norwood, MA, US) according to ASTM D638-14, "Standard Test Method for Tensile Properties of Plastics." The crosshead speed was 0.04 inch/minute (1 mm/minute). The modulus was calculated from the slope of the linear portion of the stress-strain curve.

Thermal Conductivity

For thermal conductivity measurements, disk-shaped samples were made by pressing the mixed paste into a disk-shaped silicone rubber mold which was then laminated with release liner on both sides. The disk shape gives samples with a diameter of 12.6 mm and a thickness of 2.2 mm. The sample was then cured at room temperature for 24 hours, room temperature for 15 hours, or 100° C. for 1 hour to give complete curing.

Specific heat capacity, $C_p$, was measured using a Q2000 Differential Scanning calorimeter (TA Instruments, Eden Prairie, MN, US) with sapphire as a method standard.

Sample density was determined using a geometric method. The weight (m) of a disk-shaped sample was measured using a standard laboratory balance, the diameter (d) of the disk was measured using calipers, and the thickness (h) of the disk was measured using a Mitatoyo micrometer. The density, ρ, was calculated by $\rho = m/(\pi \cdot h \cdot (d/2)^2)$.

Thermal diffusivity, α(T), was measured using an LFA 467 HYPERFLASH Light Flash Apparatus (Netzsch Instruments, Burlington, MA, US) according to ASTM E1461-13, "Standard Test Method for Thermal Diffusivity by the Flash Method."

Thermal conductivity, k, was calculated from thermal diffusivity, heat capacity, and density measurements according the formula: $k = \alpha \cdot C_p \cdot \rho$ where k is the thermal conductivity in W/(m K), α is the thermal diffusivity in $mm^2/s$, $C_p$ is the specific heat capacity in J/K-g, and ρ is the density in $g/cm^3$.

Electrical Resistivity

Surface resistivity and volume resistivity were measured with a Model 6517A Electrometer (Keithley Instruments, Cleveland, OH, US) with 100 femtoAmp resolution and an applied voltage of 500 Volts, according to the procedures in to ASTM D257-14, "Standard Test Methods for DC Resistance or Conductance of Insulating Materials." A Keithley Model 8009 Resistivity test fixture was used with compressible conductive rubber electrodes and 1 lb electrode force over approximately 2.5 inches of electrode and sample. The samples were approximately 18 mils thick. The corresponding detection threshold for surface resistivity is approximately 1017 ohms. Each sample was measured once, and an electrification time of 60 seconds was employed. A high resistance sample PTFE, a low resistance sample (bulk loaded carbon in Kapton), and a moderate resistance sample (paper) were used as material reference standards.

Results

Table 5 summarizes the elongation and overlap shear adhesion properties of example 1 to 16.

By using these multifunctional thiols disclosed in current disclosure, the curable compositions of Ex. 1 to Ex. 16 showed high elongation at break (equal to or greater than 9%) with good overlap shear adhesion properties (of 3-20 $N/mm^2$) while at the same time high thermally conductive (total thermal conductive filler loading is equal to or greater than 60 wt. %).

As content of the multifunctional thiol went up, from 5 wt. % to 20 wt. % (based on the total weight of curable composition), Ex. 1 to Ex. 7 showed high elongation at break (equal to or greater than 9%) with good overlap shear adhesion properties (greater than 5 $N/mm^2$).

As the rigid bisphenol epoxy resin (EPON 828) is present in Ex. 4 to Ex. 6 in an amount of less than 50 wt. %, based on the total weight of epoxy resin. Ex. 4 to Ex. 6 showed better elongation at break (equal to or greater than 16%) with good overlap shear adhesion properties (greater than 7 $N/mm^2$).

TABLE 5

Elongation and OLS Properties

| | OLSS-MPa, Al—Al ($N/mm^2$) | Elongation |
|---|---|---|
| Ex. 1 | 6.2 | 20% |
| Ex. 2 | 9.4 | 36% |
| Ex. 3 | 5.8 | 274% |
| Ex. 4 | 7 | 36% |
| Ex. 5 | 13.6 | 24% |
| Ex. 6 | 7.5 | 16% |
| Ex. 7 | 8.2 | 9% |
| Ex. 8 | 3.3 | 18% |
| Ex. 9 | 4.3 | 52% |
| Ex. 10 | 7.3 | 31% |
| Ex. 11 | 8.2 | 25% |
| Ex. 12 | 4.3 | 38% |
| Ex. 13 | 3.9 | 45% |
| Ex. 14 | 5.4 | 23% |
| Ex. 15 | 12.7 | 9% |
| Ex. 16 | 6.2 | 250% |

Various modifications and alterations to this disclosure will become apparent to those skilled in the art without departing from the scope and spirit of this disclosure. It should be understood that the disclosure is not intended to be unduly limited by the illustrative embodiments and examples set forth herein and that such examples and embodiments are presented by way of example only with the scope of the disclosure intended to be limited only by the claims set forth herein as follows. All references cited in this disclosure are herein incorporated by reference in their entirety.

What is claimed:

1. A curable composition comprising:

a first part comprising an epoxy resin; and a second part comprising a multifunctional, functional thiol containing compound; and an inorganic filler present in an amount of at least 40 weight %, based on the total weight of the curable composition, wherein the multifunctional, functional thiol containing compound is represented by the following formula:

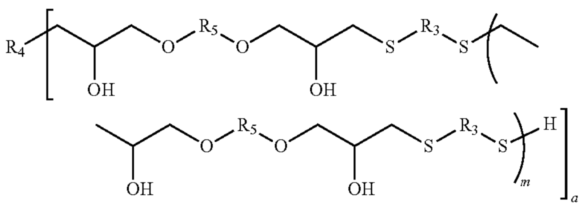

wherein, independently, $R_3$ being $R_1O(CH_2CHR_2O)_nR_1$;

each $R_1$ independently represents an alkylene group having from 2 to 12 carbon atoms;

$R_4$ being a branched aliphatic chain containing 2 to 18 sulfur or nitrogen junctions and a being 2 to 10; or $R_4$ being $HSR_1O(CH_2CHR_2O)R_1S$, and a being 1;

each $R_2$ independently represents H or $CH_3$;

n represents an integer from 1 to 20;

$R_5$ being bisphenol A, or bisphenol F, or bisphenol S, or biphenyl, or halogenated bisphenol or aliphatic chain having from 1 to 18 carbon atoms; and m being 0 to 18.

2. The curable composition of claim 1, wherein the epoxy resin of the first part comprises an internally flexible bisphenol epoxy resin of formula

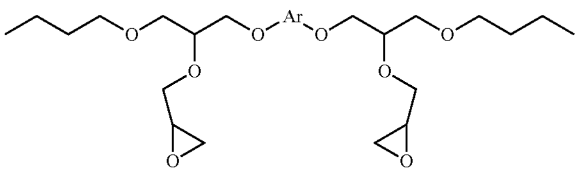

where Ar is bisphenol A, bisphenol F, bisphenol Z, or a mixture thereof.

3. The curable composition of claim 1, wherein the epoxy resin of the first part comprises a phosphonic acid group in the backbone thereof.

4. The curable composition of claim 1, wherein the epoxy resin of the first part further comprises a rigid bisphenol epoxy resin, wherein the rigid bisphenol epoxy resin is present in the curable composition in an amount of less than 50 wt. %, based on the total weight of epoxy resin.

5. The curable composition according to claim 1, further comprising an amine terminated silane coupling agent, a mercaptan terminated silane coupling agent, or an epoxy terminated silane coupling agent.

6. The curable composition according to claim 1, further comprising a catalyst.

7. The curable composition according to claim 1, wherein epoxy resin is present in the curable composition in an amount of at least 20 wt. %, based on the total weight of the unfilled curable composition.

8. The curable composition according to claim 1, wherein multifunctional, functional thiol containing compounds are present in the curable composition in an amount of 4.9-20 wt. %, based on the total weight of the unfilled curable composition.

9. The curable composition according to claim 1, further comprising a multifunctional amine.

10. The curable composition according to claim 1, wherein the inorganic filler present in an amount of at least 50 wt. %, based on the total weight of the curable composition.

11. An article comprising a cured composition, wherein the cured composition is the reaction product of the curable composition according to claim 1.

12. The article of claim 11, wherein the cured composition has a thickness between from 5 microns to 10000 microns.

13. The article of claim 11, further comprising a metal substrate having a surface, wherein the cured composition is disposed on the surface of the substrate.

14. The article of claim 11 comprising a first substrate, a second substrate and the cured composition disposed between and adhering the first substrate to the second substrate.

15. The article of claim 11, wherein the article is a battery module comprising a plurality of battery cells connected to a first base plate by a first layer of the reaction product of the curable composition.

16. A method of making a battery module comprising: applying a first layer of a curable composition according to claim 1 to a first surface of a first base plate, attaching a plurality of battery cells to the first layer to connect the battery cells to the first base plate, and curing the curable composition.

* * * * *